United States Patent
Ogawa

(10) Patent No.: US 8,684,537 B2
(45) Date of Patent: Apr. 1, 2014

(54) LIGHT SOURCE UNIT AND PROJECTOR FOR CONTROLLING ILLUMINATION CYCLES OF RESPECTIVE LIGHT SOURCES AND ROTATION OF A LUMINESCENT WHEEL

(75) Inventor: Masahiro Ogawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 741 days.

(21) Appl. No.: 12/913,875

(22) Filed: Oct. 28, 2010

(65) Prior Publication Data

US 2011/0096296 A1    Apr. 28, 2011

(30) Foreign Application Priority Data

Oct. 28, 2009  (JP) ................. 2009-247696

(51) Int. Cl.
*G03B 21/14* (2006.01)
*G03B 21/00* (2006.01)
*G03B 21/20* (2006.01)

(52) U.S. Cl.
USPC .................. 353/84; 353/31; 353/85

(58) Field of Classification Search
USPC .......... 353/85, 30, 31, 94, 122, 84, 97; 362/2, 362/293, 510, 512, 84, 800, 260, 259; 352/41, 42; 359/308, 722, 723, 885, 359/890, 892, 884; 348/786; 315/294, 297, 315/307
See application file for complete search history.

(56) References Cited

U.S. PATENT DOCUMENTS

2006/0007407 A1    1/2006  Matsui
2007/0019408 A1    1/2007  McGuire, Jr. et al.

FOREIGN PATENT DOCUMENTS

| JP | 2004-341105 A | 12/2004 | |
|----|---|---|---|
| JP | 2005-156607 A | 6/2005 | |
| JP | 2006-011087 A | 1/2006 | |
| JP | 2007-218956 A | 8/2007 | |
| TW | M331685 U | 5/2008 | |
| WO | WO 2007/023681 | * 3/2007 | ............ G03B 21/14 |

OTHER PUBLICATIONS

Korean Office Action dated Apr. 19, 2012 (and English translation thereof) in counterpart Korean Application No. 10-2010-0104906.
Taiwanese Office Action dated Apr. 25, 2013 (and English translation thereof) in counterpart Taiwanese Application No. 099136637.

* cited by examiner

*Primary Examiner* — Pascal M Bui Pho
(74) *Attorney, Agent, or Firm* — Holtz, Holtz, Goodman & Chick, PC

(57) ABSTRACT

To provide a light source unit enabling a stable projection without a luminescent material heating and a projector, a projector of the invention including a light source unit, a display device, a light guiding optical system, a projection side optical system and a light source control device. The light source unit includes an excitation light shining device, a luminescent wheel emitting a luminescent ray of a green wavelength band and a light source optical system collecting rays from the luminescent wheel and respective light sources on a predetermined plane. The light source control device controls the excitation light shining device, each light source device of red and blue so that a period of time required for turning-on once of the excitation light shining device, and each light source device of red and blue becomes a non-integral multiple of a period of time required for one rotation of the luminescent wheel.

5 Claims, 6 Drawing Sheets

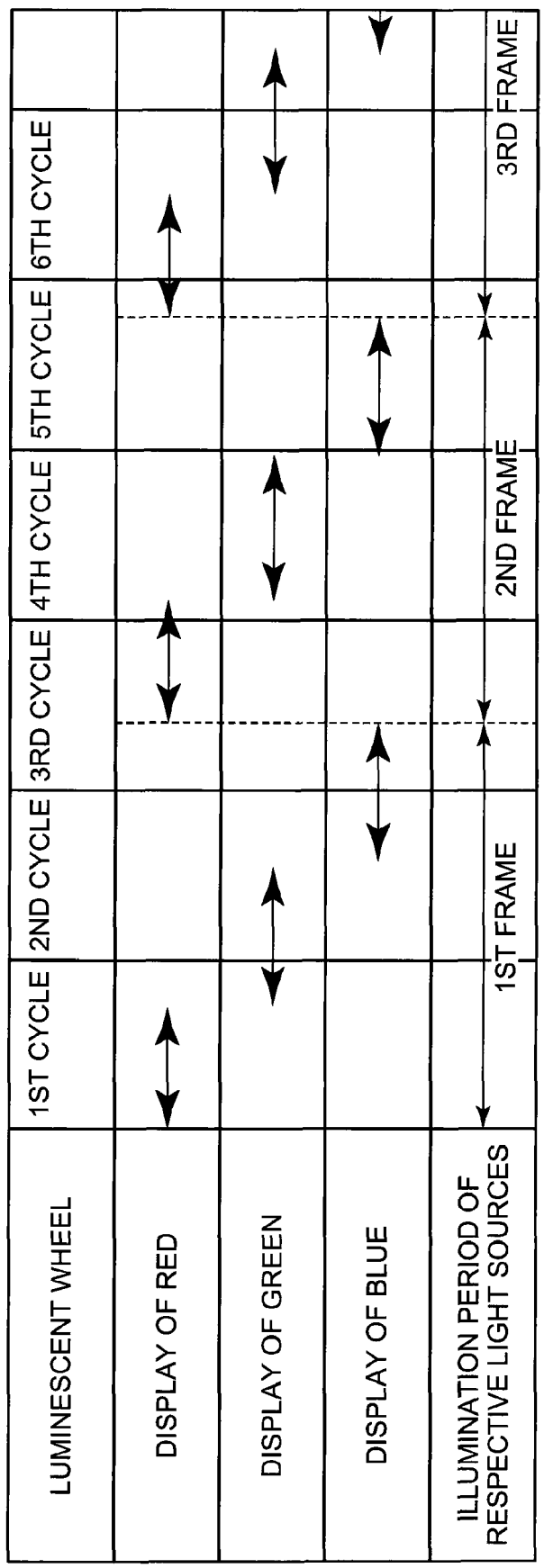

LIGHT SOURCE UNIT AND PROJECTOR FOR CONTROLLING ILLUMINATION CYCLES OF RESPECTIVE LIGHT SOURCES AND ROTATION OF A LUMINESCENT WHEEL

CROSS-REFERENCE TO RELATED APPLICATIONS

This application is based upon and claims the benefit of priority under 35 USC 119 of Japanese Patent Application No. 2009-247696 filed on Oct. 28, 2009, the entire disclosure of which, including the description, claims, drawings and abstract thereof, is incorporated herein by reference.

BACKGROUND OF THE INVENTION

1. Field of the Invention

The present invention relates to a light source unit and a projector which includes the light source unit.

2. Description of the Related Art

In these days, data projectors are used on many occasions as image projection apparatuses which project images including images of screens and video images of personal computers, as well as images based on image data which is stored in memory cards on to a screen. These projectors are such that light emitted from a light source is collected to a micromirror device called DMD (Digital Micromirror Device) or a liquid crystal plate for display of a color image onto the screen.

Conventionally, projectors have constituted the mainstream of projectors of the type described above which use a high-intensity discharge lamp which emits white light as a light source and in which a color image is projected by coloring the white light so emitted by a color wheel. However, with the projectors in which the white light is colored by the color wheel, since only light of a predetermined wavelength band is extracted from the white light for projection, there is caused a problem that the utilization efficiency of a pencil of light or light rays which are emitted from the light source is low. In addition, there is also a problem that the life of high-intensity discharge lamps is short.

To cope with these problems, in recent years, there have been made many developments and proposals on projectors which use, as a light source, a light emitting diode (LED), a laser diode (LD) or a solid light emitting device (a semiconductor light emitting device) such as a device utilizing organic EL technology. For example, Japanese Unexamined Patent Publication No. 2004-341105 (JP-A-2004-341105) proposes a light source unit which includes a luminescent wheel in which a luminescent material layer or layers are laid in a circumferential direction on a transparent disk and an ultraviolet radiation emitting diode which functions as a semiconductor light emitting device. The light source of the proposal in JP-A-2004-341105 is configured so that ultraviolet radiation is shone onto the luminescent wheel from a rear surface side thereof as excitation light so as for luminescent light to be emitted from a front surface side of the luminescent wheel for use as light source light.

In the invention described in JP-A-2004-341105, a red luminescent material, a green luminescent material and a blue luminescent material are exited by the ultraviolet radiation, and luminescent light rays which are emitted from the luminescent materials are reflected by a digital mircromirror device whose mirrors are switched between ON and OFF so that light rays reflected by the mirrors in the "on" position produce an image. Consequently, compared with the case in which white light emitted from the discharge lamp is colored by the color wheel, the utilization efficiency of light rays emitted from the light source can be enhanced.

In the projector, however, since the luminescent materials of the three colors are laid from end to end in the circumferential direction of the luminescent wheel with the excitation light kept shone onto the luminescent wheel, the luminescent materials are heated to reduce the luminous efficiency thereof, leading to a problem that unevenness in luminance is produced in red, green and blue luminescent light rays and therefore, a high-quality image cannot be projected. In addition, there has been a problem that the luminance and color saturation of the red, green and blue luminescent light rays differ color by color and the colors that are attempted to be projected cannot be reproduced. Further, since the excitation light source is kept turned on at all times, the aging deterioration of the excitation light source is promoted, and the product life of the projector is shortened.

SUMMARY OF THE INVENTION

The invention has been made in view of the problems inherent in the related art and an object thereof is to provide a light source unit in which luminescent materials are prevented from being heated even in the event that the light source unit is used continuously for many hours so as to enable a stable projection and a projector which includes the light source unit.

According to an aspect of the invention, there is provided a light source unit comprising an excitation light shining device for emitting excitation light, a luminescent wheel in which a luminescent material is laid on at least a whole circumferential area through which the excitation light passes, the luminescent material receiving the light emitted from the excitation light shining device as excitation light to emit a luminescent light ray of a predetermined wavelength band, two types of light source devices which emit light rays of different wavelength bands from that of the light ray emitted from the luminescent wheel, a light source optical system for collecting the luminescent light ray emitted from the luminescent wheel and the light rays emitted from the two types of light source devices onto a predetermined plane and a light source control device for time-sharing controlling the excitation light shining device and the two types of light source devices and controlling the rotation of the luminescent wheel, wherein the light source control device controls, with time sharing, the excitation light shining device and the two types of light source devices and controls the rotating speed of the luminescent wheel so that a period of time required for the excitation light shining device and the two types of light source devices to be turned on once and sequentially does not become an integral multiple of a period of time required for the luminescent wheel to rotate one rotation.

In addition, in the light source unit of the invention, the luminescent material laid on the luminescent wheel is referred to as a green luminescent material which receives the light emitted from the excitation light shining device to emit a luminescent light ray of a green wavelength band, and the two types of light source devices are referred to as a red light source device for emitting a light ray of a red wavelength band and a blue light source device for emitting a light ray of a blue wavelength band.

Further, in the light source unit of the invention, the light source control device controls, with time sharing, the excitation light shining device and the two types of light source devices and controls the rotating speed of the luminescent wheel so that a resulting number of dividing the period of time required for the luminescent wheel to rotate one rotation by the period of time required for the excitation light shining device and the two types of light source devices to be turned on once and sequentially becomes an irrational number.

A projector of the invention comprises a light source unit comprising, in turn, an excitation light shining device for emitting excitation light, a luminescent wheel in which a luminescent material is laid on at least a whole circumferential area through which the excitation light passes, the luminescent material receiving the light emitted from the excitation light shining device as excitation light to emit a luminescent light ray of a predetermined wavelength band, two types of light source devices which emit light rays of different wavelength bands from that of the light ray emitted from the luminescent wheel, a light source optical system for collecting the luminescent light ray emitted from the luminescent wheel and the light rays emitted from the two types of light source devices onto a predetermined plane and a light source control device for controlling, with time sharing, the excitation light shining device and the two types of light source devices and controlling the rotation of the luminescent wheel, wherein the light source control device controls, with time sharing, the excitation light shining device and the two types of light source devices and controls the rotating speed of the luminescent wheel so that a period of time required for an image of one frame to be produced by use of the light from the excitation light shining device and the light rays from the two types of light source devices does not become an integral multiple of a period of time required for the luminescent wheel to rotate one rotation, a display device for producing an image by modulating the light from the light source unit, a light guiding optical system for guiding the light from the light source unit to the display device, a projection-side optical system for projecting an image emitted from the display device onto a screen, and a projector control device for controlling the light source unit and the display device.

According to the invention, there can be provided the light source unit in which the luminescent materials are prevented from being heated even in the event that the light source unit is used continuously for many hours so as to enable a stable projection and the projector which includes the light source unit.

BRIEF DESCRIPTION OF THE DRAWINGS

The invention will be understood much sufficiently by reading the following detailed description thereof and referring to the accompanying drawings. However, the detailed description and the accompanying drawings are intended mainly to describe the invention and are not intended to limit the scope thereof. In the accompanying drawings;

FIG. 6 is a chart showing a relationship between the illumination cycles of the respective light sources and rotation of the luminescent wheel of the light source unit according to the embodiment of the invention.

DETAILED DESCRIPTION OF THE PREFERRED EMBODIMENT

Figure 1:
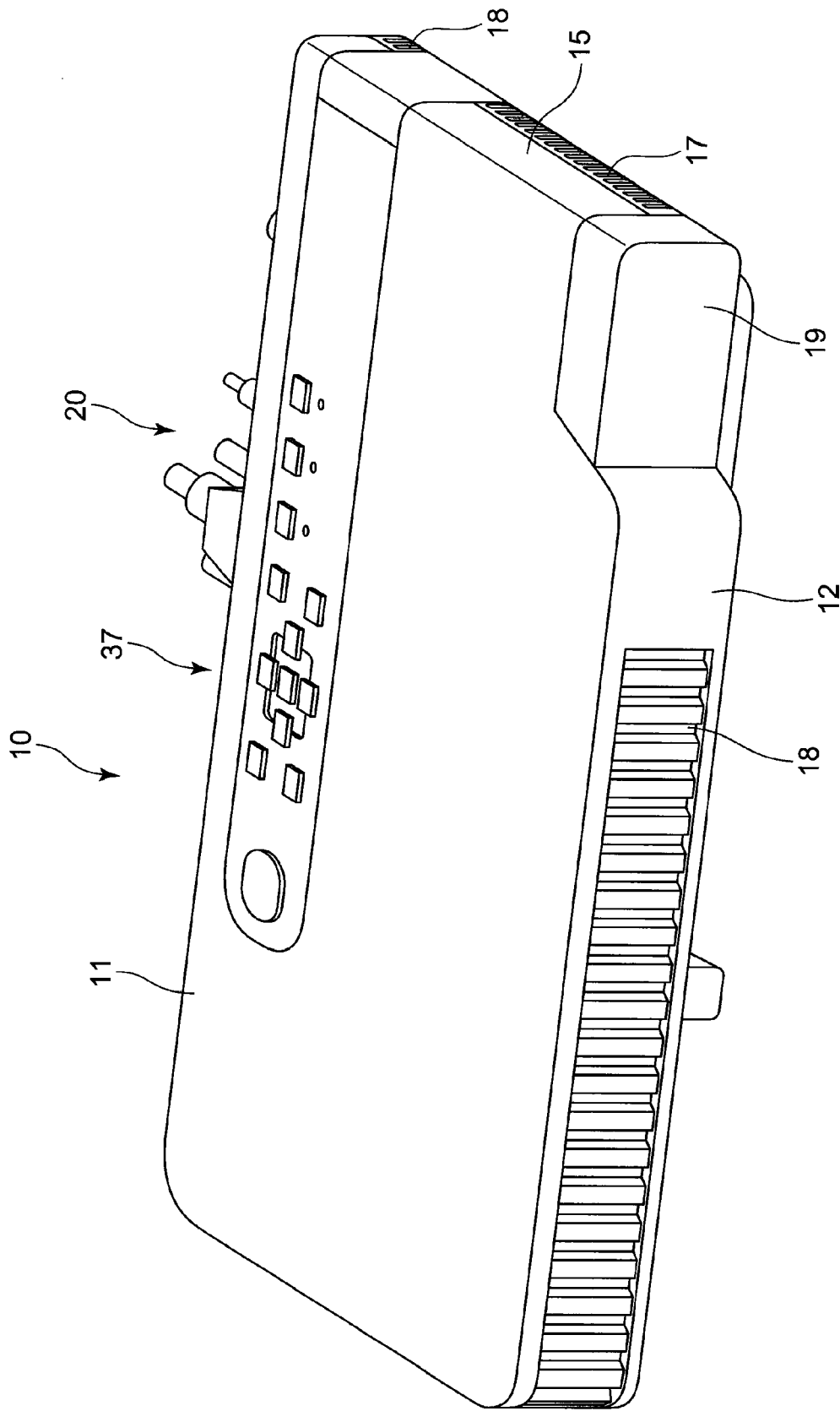
FIG. 1 is a perspective view showing an external appearance of a projector according to an embodiment of the invention.

Hereinafter, a preferred mode for carrying out the invention will be described by use of the accompanying drawings. Although various limitations which are technically preferable for carrying out the invention are imposed on an embodiment which will be described below, the scope of the invention is not limited in any way to the following description and illustrated examples.

Hereinafter, a mode for carrying out the embodiment will be described. A projector 10 includes a light source unit 60, a display device 51, a light guiding optical system 170 for guiding light from the light source unit 60 to the display device 51, a projection-side optical system 220 for projecting an image emitted from the display device 51 onto a screen, and a projector control device for controlling the light source unit 60 and the display device 51.

The light source unit 60 further includes an excitation light shining device 70 for emitting excitation light, a luminescent wheel 101 in which a luminescent material is laid on at least a whole circumferential area through which the excitation light passes, the luminescent material receiving the light emitted from the excitation light shining device 70 as excitation light to emit a luminescent light ray of a predetermined wavelength band, two types of light source devices 120, 300 which emit light rays of different wavelength bands from that of the light ray emitted from the luminescent wheel 101, a light source optical system 140 for collecting the luminescent light ray emitted from the luminescent wheel 101 and the light rays emitted from the two types of light source devices 120, 300 onto a predetermined plane and a light source control device for controlling, with time sharing, the excitation light shining device 70 and the two types of light source devices 120, 300 and controlling the rotation of the luminescent wheel 100.

The luminescent material laid on the luminescent wheel 101 is a green luminescent material which receives the light emitted from the excitation light shining device 70 to emit a luminescent light ray of a green wavelength band. The two types of light source devices 120, 300 are a red light source device 120 for emitting a light ray of a red wavelength band and a blue light source device 300 for emitting a light ray of a blue wavelength band. Further, the excitation light shining device 70 includes an excitation light source 71 which is a laser emitter for emitting a laser beam of a blue wavelength band. The red light source device 120 includes a red light source 121 which is a red light emitting diode for emitting a light ray of a red wavelength band. The blue light source device 300 includes a blue light source 301 which is a blue light emitting diode for emitting a light ray of a blue wavelength band.

In addition, the light source control device controls, with time sharing, the respective light sources 71, 121, 301 and controls a rotating speed of the luminescent wheel 101 by controlling a wheel motor so that a period of time required for the excitation light source 71 of the excitation light shining device 70, the red light source 121 of the red light source device 120 and the blue light source 301 of the blue light source device 300 to be turned one once and sequentially does not become an integral multiple of a period of time required for the luminescent wheel 101 to rotate one rotation.

Further, in the light source unit 60 of the invention, the light source control device controls, with time sharing, individually the excitation light source 71, the red light source 121 and the blue light source 301 and controls the rotating speed of the luminescent wheel 101 so that a resulting number of dividing the period of time required for the luminescent wheel 101 to rotate one rotation by the period of time required for the excitation light source 71, the red light source 121 and the blue light source 301 to be turned on once and sequentially becomes an irrational number.

Hereinafter, an embodiment of the invention will be described in detail by reference to the accompanying drawings.

FIG. 1 is a perspective view showing an external appearance of a projector 10. In this embodiment, left and right with respect to the projector 10 denote, respectively, left and right directions with respect to a projecting direction, and front and rear denote, respectively, front and rear directions with respect to a screen side direction of the projector 10 and a traveling direction of a pencil of light or light rays.

As is shown in FIG. 1, the projector 10 has a substantially rectangular parallelepiped shape and has a lens cover 19 which covers a projection port which is laid to a side of a front panel 12 which is referred to as a front side panel of a housing of the projector, as well as a plurality of outside air inlet holes 18 in the front panel 12. Further, although not shown, the projector 10 includes an Ir reception part for receiving a control signal from a remote controller.

In addition, a keys/indicators part 37 is provided on an upper side panel 11 of the housing. Disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side or a back side panel of the housing are an input/output connectors part where USB terminals, an image signal input D-SUB terminal, an S terminal, an RCA terminal and the like and various types of terminals 20 including a power supply adaptor plug and the like. A plurality of outside air inlet holes 18 are formed in the back side panel. A plurality of inside air outlet ports 17 are formed in each of a right-hand side panel 14 which constitutes a side panel of the housing, not shown, and a left-hand side panel 15 which constitutes a side panel shown in FIG. 1. In addition, outside air inlet holes 18 are also formed in a corner portion of the left-hand side panel 15 which lies in proximity to the back side panel. Further, a plurality of outside air inlet holes or a plurality of inside air outlet holes are formed in a bottom panel, which is not shown, in each of positions lying in proximity to the front side panel, the back side panel, the left-hand side panel and the right-hand side panel.

Figure 2:
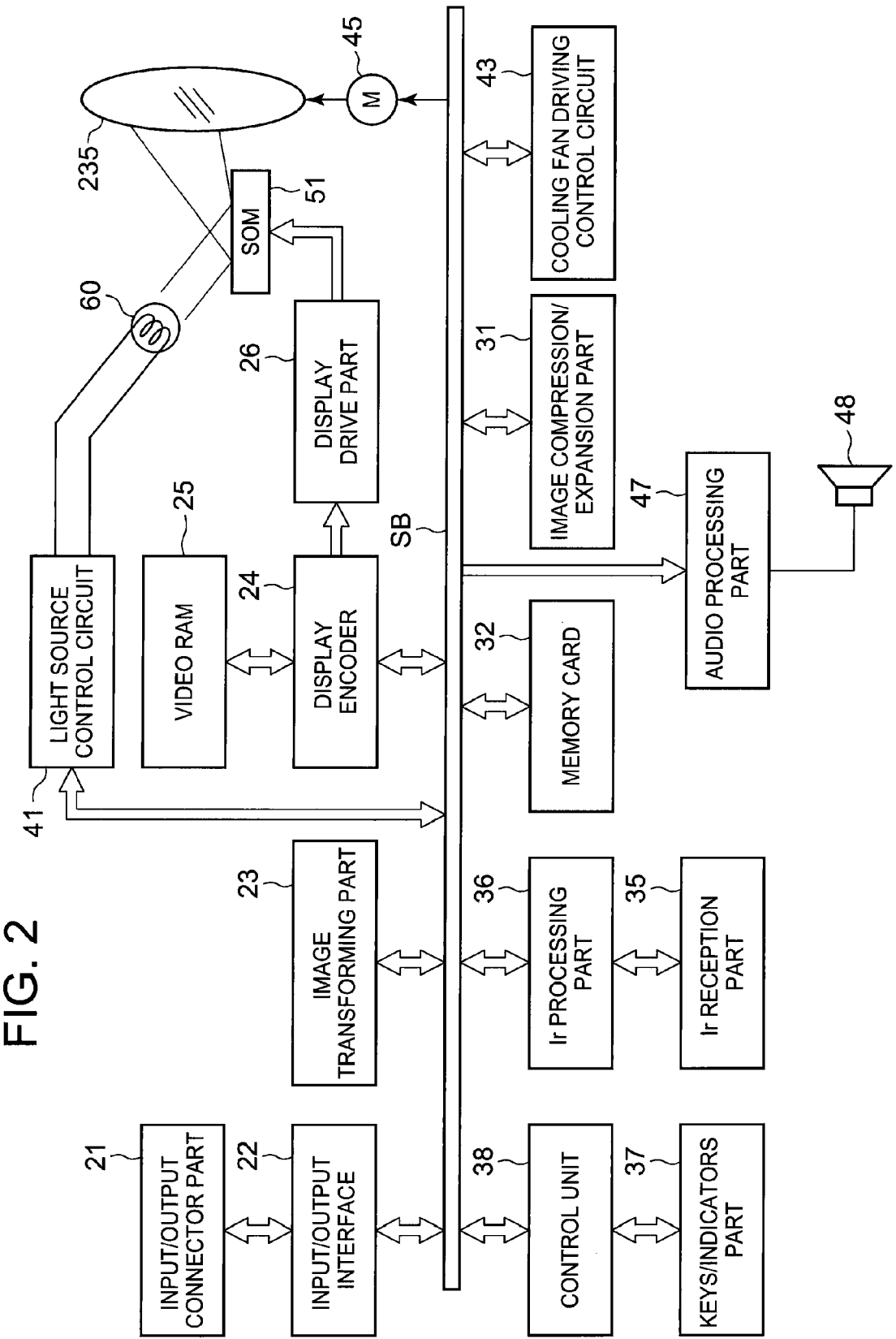
FIG. 2 is a functional circuit block diagram of the projector according to the embodiment of the invention.

Next, a projector control device of the projector 10 will be described by use of a block diagram in FIG. 2. The projector control device includes a control unit 38, an input/output interface 22, an image transforming part 23, a display encoder 24, a display drive part 26 and the like.

The control unit 38 governs the control of respective operations of circuitries within the projector 10 and is made up of a CPU, a ROM which stores in a fixed fashion operation programs of various types of settings and a RAM which is used as a work memory.

Image signals of various standards that are inputted from the input/output connector part 21 are sent via the input/output interface 22 and a system bus (SB) to the image transforming part 23 where the image signals are transformed so as to be unified into an image signal of a predetermined format which is suitable for display. Thereafter, the image signals so transformed are outputted to the display encoder 24.

In addition, the display encoder 24 deploys the image signals entered thereinto on a video RAM 25 for storage therein and generates a video signal from the contents stored in the video RAM 25, outputting the video signal so generated to the display drive part 26.

The display drive part 26 functions as a display device controller and drives a display device 51 which is a spatial optical modulator (SOM) at an appropriate frame rate in accordance with the image signal outputted from the display encoder 24. A pencil of light or light rays which are emitted from a light source unit 60 are shone onto the display device 51 via a light guiding optical system to thereby form an optical image by reflected light reflected at the display device 51. The image so formed can be projected on to a screen, not shown, for display via a projection-side optical system, which will be described later. A movable lens group 235 of the projection-side optical system is driven by a lens motor 45 for zooming or focusing.

In addition, an image compression/expansion part 31 performs a recording operation in which a luminance signal and a color difference signal of an image signal are data compressed through ADCT and Huffman effect and the compressed data is sequentially written on a memory card 32 which is configured as a detachable recording medium. The image compression/expansion part 31 further performs an operation in which when in a reproducing mode, the image compression/expansion part 31 reads out image data recorded on the memory card 32 and expands individual image data which make up a series of dynamic images frame by frame. Then, the image data is outputted to the display encoder 24 via the image transforming part 23 so as to enable the display of dynamic images on the basis of the image data stored on the memory card 32.

Operation signals generated at the keys/indicators part 37 which is made up of the main keys and indicators provided on the upper side panel 11 of the housing are sent out directly to the control unit 38, while key operation signals generated by operating keys on the remote controller are received by the Ir reception part 35, and a code signal demodulated at an Ir processing part 36 is outputted to the control unit 38.

In addition, an audio processing part 47 is connected to the control unit 38 via the system bus (SB). This audio processing part 47 includes a sound source circuit such as a PCM sound source. When in a projection mode and a reproducing mode, the audio processing part 47 converts audio data into analog signals and drives a speaker 48 to output loudly sound or voice based on the audio data.

Additionally, the control unit 38 controls a light source control circuit 41 which is configured as a light source control device. This light source control circuit 41 controls individually the emission of light by an excitation light shining device, a red light source device and a blue light source device of the light source unit 60 so that light of a predetermined wavelength band which is required at the time of generating an image is emitted from the light source unit 60.

Further, the control unit 38 causes a cooling fan drive control circuit 43 to detect temperatures through a plurality of sensors which are provided at the light source unit 60 so as to control the rotating speed of a cooling fan based on the results of the temperature detection. In addition, the control unit 38 also causes the cooling fan drive control circuit 43 to make the cooling fan continue to rotate even after the power supply of a projector main body is switched off by use of a timer or the like or to make the power supply to the projector main body be cut off depending upon the results of the temperature detection by the temperature sensors.

Figure 3:
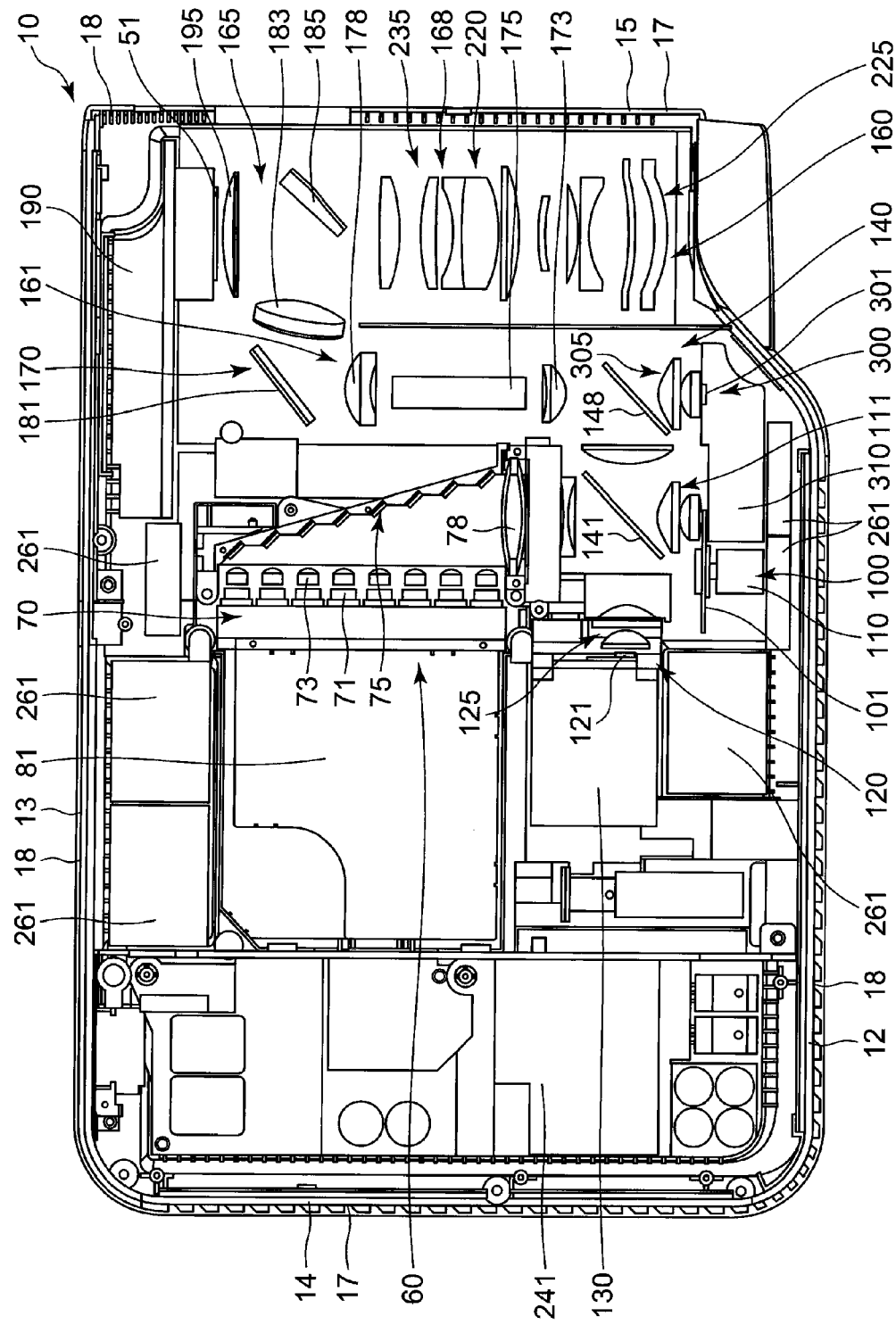
FIG. 3 is an exemplary plan view showing an internal construction of the projector according to the embodiment of the invention.

Next, an internal construction of the projector 10 will be described. FIG. 3 is an exemplary plan view showing an internal construction of the projector 10. As is shown in FIG. 3, the projector 10 includes a control circuit board 241 which is disposed in proximity to the right-hand side panel 14. This control circuit board 241 includes a power supply circuit block and a light source control block. In addition, the projector 10 includes the light source unit 60 which is provided at a substantially central portion of the housing of the projector. Further, the projector 10 includes an optical system unit 160 which is disposed between the light source unit 60 and the left-hand side panel 15.

The light source unit 60 includes an excitation light shining device 70 which is disposed at a substantially central portion of the housing of the projector in a left-right direction and in proximity to the back panel 13, a luminescent light emitting device 100 which is disposed on optical axes of light rays which are emitted from the excitation light shining device 70 and in proximity to the front panel 12, a blue light source device 300 which is disposed in proximity to the front panel 12 so as to be in parallel with the light rays which are emitted from the luminescent light emitting device 100, a red light source device 120 which is disposed between the excitation light shining device 70 and the luminescent light emitting device 100, and a light source optical system 140 which alters optical axes of the light rays emitted from the luminescent light emitting device 100, optical axes of the light rays emitted from the red light source device 120 and optical axes of the light rays emitted from the blue light source device 300 so that the respective optical axes of the light rays converge to the same optical axis as to collect the respective colored light rays on to an incident opening of a light tunnel 175 which constitutes a predetermined plane.

The excitation light shining device 70 includes an excitation light source 71 which is disposed so that optical axes of light rays emitted therefrom become parallel to the back panel 13, a reflecting mirror group 75 which alters the optical axes of the light lays emitted from the excitation light source 71 through 90 degrees so as to be oriented towards the front panel 12, a collective lens 78 for collecting the light rays emitted from the excitation light source 71 and reflected on the reflecting mirror group 75 and a heat sink 81 which is disposed between the excitation light source 71 and the right-hand side panel 14.

The excitation light source 71 includes a plurality of blue laser diodes which are arranged into a matrix configuration, and collimator lenses 73 are disposed individually on optical axes of the blue laser diodes so as to convert light rays emitted from the respective blue laser diodes into parallel light rays. In the reflecting mirror group 75, a plurality of reflecting mirrors are arranged in a step-like fashion so as to emit the light rays emitted from the excitation light source 71 towards the collective lens 78 while reducing sectional areas of the light rays so emitted in one direction.

A cooling fan 261 is disposed between the heat sink 81 and the back panel 13, and the excitation light source 71 is cooled by the cooling fan 261 and the heat sink 81. Further, a cooling fan 261 is also disposed between the reflecting mirror group 75 and the back panel 13, and the reflecting mirror group 75 and the collective lens 78 are cooled by the cooling fan 261.

The luminescent light emitting device 100 includes a luminescent wheel 101 which is disposed so as to be parallel to the front panel 12, that is, so as to be at right angles to the optical axis of the light emitted from the excitation light source 71, a wheel motor 110 which drives the luminescent wheel 101 to rotate and a collective lens group 111 which collects light rays emitted from the luminescent wheel 101 in the direction of the back panel 13.

Figure 4A:
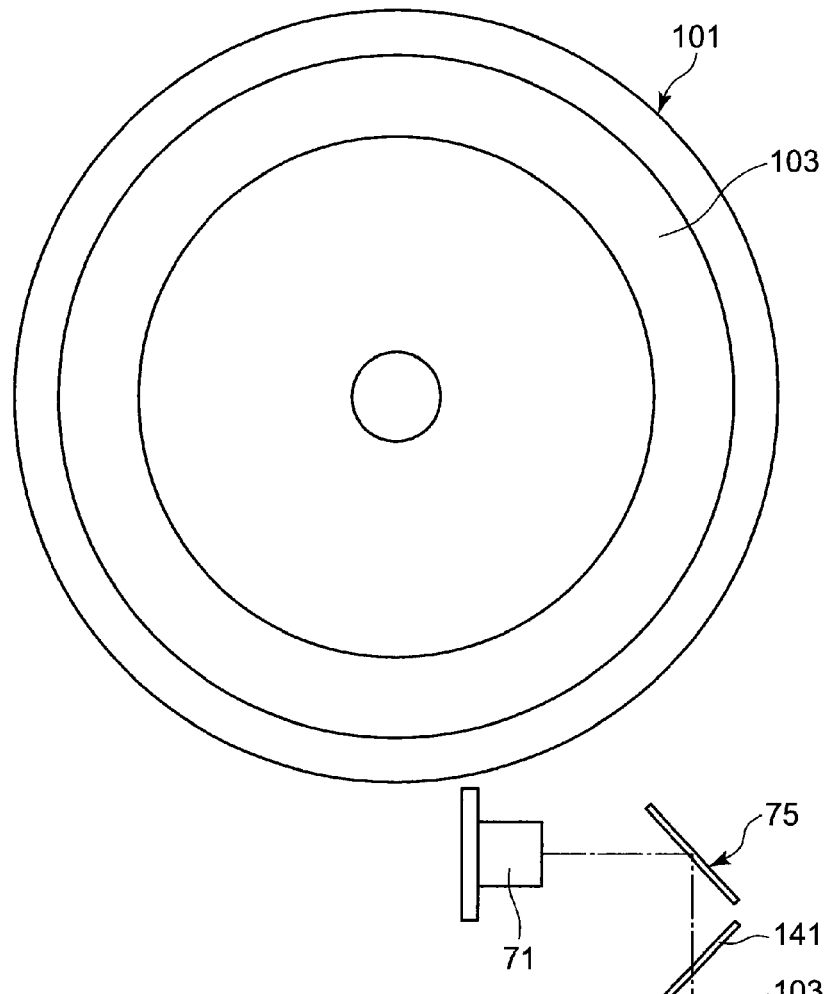
FIG. 4A is an exemplary front view of a luminescent wheel according to the embodiment of the invention.
Figure 4B:
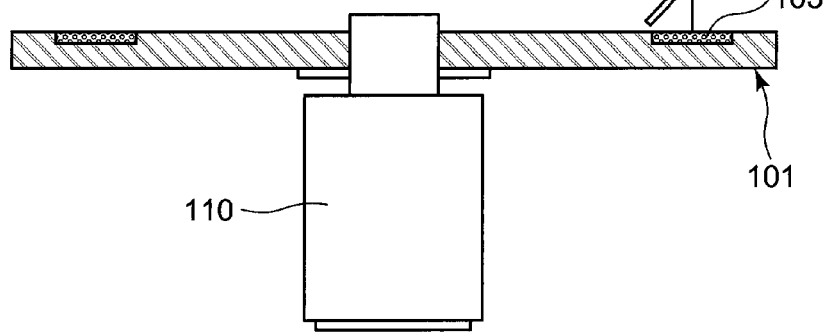
FIG. 4B is an exemplary partially sectional plan view of the luminescent wheel.

As is shown in FIG. 4, the luminescent wheel 101 is a circular disc-shaped metallic base material. An annular luminescent light emitting area is formed on the luminescent wheel 101 as a recess portion. This annular luminescent light emitting area receives the light emitted from the excitation light source 71 as excitation light so as to emit luminescent light of a green wavelength band. The luminescent wheel 101 functions as a luminescent plate which receives excitation light so as to emit luminescent light. A surface of an excitation light source 71 side of the luminescent wheel 101 which includes the luminescent light emitting area is mirror finished through silver vapor deposition so as to form a reflecting surface thereon. A green luminescent material layer 103 is laid on this reflecting surface.

The light emitted from the excitation light shining device 70 so as to be shone onto the green luminescent material layer 103 of the luminescent wheel 101 excites a green luminescent material in the green luminescent material layer 103. Luminescent light rays which are emitted by luminescence in every direction from the green luminescent material are emitted directly towards the excitation light source 71 side or is reflected on the reflecting surface so as to be then emitted towards the excitation light source 71. Excitation light which is shone onto the metallic base material without being absorbed by the luminescent material in the luminescent material layer 103 is reflected on the reflecting surface so as to enter the luminescent material layer 103 again to excite the luminescent material layer 103. Consequently, by making a surface of the recess portion in the luminescent wheel 101 function as the reflecting surface, the utilization efficiency of excitation light emitted from the excitation light source 71 can be increased so that the luminescent wheel 101 can luminesce more brightly.

In excitation light which is reflected towards the luminescent material layer 103 side on the reflecting surface of the luminescent wheel 101, excitation light emitted towards the excitation light source 71 side without being absorbed by the luminescent material passes through a primary dichroic mirror 141, which will be described later, while luminescent light is reflected by the primary dichroic mirror 141. Thus, there is no such situation that excitation light is emitted to the outside of the light source unit 60. Then, as is shown in FIG. 3, the cooling fan 261 is disposed between the wheel motor 110 and the front panel 12, whereby the luminescent wheel 101 is cooled by this cooling fan 261.

The red light source device 120 includes a red light source 121 which is disposed so that its optical axis becomes parallel to the excitation light source 71 and a collective lens group which collects light emitted from the red light source 121. This red light source device 120 is disposed so that its optical axis intersects the light emitted from the excitation shining device 70 and the luminescent light of the green wavelength band emitted from the luminesce wheel 101 at right angles. The red light source 121 is a red light emitting diode which is a semiconductor light emitting device which emits light of a red wavelength band. The red light source device 120 includes a heat sink 130 which is disposed on a side of the red light source 121 which faces the right-hand side panel 14. A cooling fan 261 is disposed between the heat sink 130 and the front panel 12, whereby the red light source 121 is cooled by this cooling fan 261.

The blue light source device 300 includes a blue light source 301 which is disposed so as to be parallel to an optical axis of the luminescent light emitted from the luminescent light emitting device 100 and a collective lens group 305 which collects light emitted from the blue light source 301. This blue light source device 300 is disposed so that its optical axis intersects the light emitted from the red light source device 120. The light source 301 is a blue light emitting diode which is a semiconductor light emitting device which emits light of a blue wavelength band. The blue light source device 300 includes a heat sink 310 which is disposed on a side of the blue light source 301 which faces the front panel 12. A cooling fan 261 is disposed between the heat sink 310 and the front panel 12, whereby the blue light source 301 is cooled by this cooling fan 261.

The light source optical system 140 includes a collective lens which collects light rays of red, green and blue wavelength bands and dichroic mirrors which alter optical axes of the light rays of the respective wavelength bands so that the light rays converge to the same optical axis. Specifically, the primary dichroic mirror 141 is disposed in a position where the optical axes of the light of the blue wavelength band emitted from the excitation light shining device 70 and the light of the green wavelength band emitted from the luminescent wheel 101 intersect the optical axis of the light of the red wavelength band emitted from the red light source device 120. This primary dichroic mirror 140 transmits the light of the blue wavelength band and the light of the red wavelength band and reflects the light of the green wavelength band so as to alter the optical axis of the light of the green wavelength band through 90 degrees in the direction of the left-hand side panel 15.

A secondary dichroic mirror 148 is disposed in a position where the optical axis of the light of the blue wavelength band emitted from the blue light source device 300 and the optical axis of the light of the red wavelength band emitted from the red light source device 120 intersect each other. This secondary dichroic mirror 148 transmits the light of the blue wavelength band and reflects the light of the green wavelength band and the light of the red wavelength band so as to alter the optical axes of the light of the green wavelength band and the light of the red wavelength band through 90 degrees in the direction of the back panel 13. A collective is disposed between the primary dichroic mirror 141 and the secondary dichroic mirror 148.

The optical system unit 160 has a substantially U-shape and includes three blocks such as an illumination-side block 161 which is positioned to a left-hand side of the excitation light shining device 70, an image generation block 165 which is positioned in proximity to a position where the back panel 13 and the left-hand side panel 15 intersect each other, and a projection side block 168 which is positioned between the light source optical system 140 and the left-hand side panel 15.

The illumination-side block 161 includes part of a light guiding optical system 170 which guides light source light emitted from the light source unit 60 to the display device 51 which is included in the image generation block 161. The light guiding optical system 170 that is included in the illumination-side block 161 includes the light tunnel 175 which converts light rays emitted from the light source unit 60 into light rays whose intensity distribution is uniform, a collective lens 173 which collects the light source light onto an incident plane of the light tunnel 175, a collective lens 178 which collets light rays emitted from the light tunnel 175, an optical axis altering mirror 181 which alters optical axes of the light rays emitted from the light tunnel 175 in the direction of the image generation block 165.

The image generating block 165 has, as the light guiding optical system 170, a collective lens 183 which collects the light source light which is reflected by the optical axis altering mirror 181 to the display device 51 and a shining mirror 185 which shines the light rays which have passed through the collective lens 183 onto the display device 51 at a predetermined angle. The image generation block 165 includes further a DMD which is the display device 51. A heat sink 190 is disposed between the display device 51 and the back panel 13 so as to cool the display device 51. The display device 51 is cooled by this heat sink 190. A collective lens 195, which constitutes the projection-side optical system 220, is disposed in proximity to a front of the display device 51.

The projection-side block 168 has a lens group of the projection-side optical system 220 which projects on-light reflected by the display device 51 onto the screen. The projection-side optical system 220 is configured as a variable focus lens including a fixed lens group 225 which is incorporated in a fixed lens barrel and a movable lens group 235 which is incorporated in a movable lens barrel, whereby the variable focus lens enables zooming and focusing operations by moving the movable lens group 235 by a lens motor.

Next, a light source control method in the light source unit 60 which is configured in the way described above will be described. As has been described, in the projector 10 of the embodiment, the light ray of the red wavelength band is emitted from the red light source 121, the light ray of the green wavelength band is emitted from the luminescent wheel 101 which emits the same light ray by receiving the light emitted from the excitation light shining device 70 as excitation light, and the light ray of the blue wavelength band is emitted from the blue light source 301.

The red light source 121, the excitation light source 71 and the blue light source 301 are controlled with time sharing by the light source control circuit 41, which is the light source control device, so that the light rays of the respective wavelength bands are sequentially emitted to the display device 51 in the order of the light ray of the red wavelength band, the light ray of the green wavelength band and the light ray of the blue wavelength band. In addition, the respective light sources are duty driven by the light source control circuit 41. Namely, the respective light sources 71, 121, 301 are turned on sequentially in the order; the red light source 121 is turned on, the excitation light source 71 is turned on, and the blue light source 301 is turned on, and while one of the light sources is being turned on, the other light sources are kept turned off.

Consequently, the respective light sources 71, 121, 301 each have a period of time when it is not turned on, and hence, their mean current value can be suppressed to a low level. Thus, even in the event that a high voltage is applied to the light sources 71, 121, 301 when they are turned on, compared with the case in which they are kept turned on at all times, the speed at which the semiconductor light emitting devices are deteriorated with time can be suppressed, thereby making it possible to realize a long life. In addition, since the high voltage can be applied to the light sources 71, 121, 301, the output of the light sources 71, 121, 301 when they are turned on can be enhanced so as to enable the projection of an image with high luminance.

In the light source unit 60 configured in the way described above, since the respective light sources 71, 121, 301 are controlled, with time sharing, the excitation light is shone onto a range on the luminescent material laid on the luminescent wheel 101 which receives the excitation light from the excitation light source 71 to emit a luminescent light ray, the range being based on a period of time when the excitation light source 71 is turned on in one frame and the rotating speed of the luminescent wheel 101. On the other hand, the luminescent material has a property that the luminous efficiency is decreased when its temperature becomes a predetermined temperature or higher or exceeds 100° C. in particular. Consequently, in the event that the light emitted from the excitation light source 71 is shone onto the same position on the luminescent wheel 101 at all times, the temperature of the luminescent material situated at the portion onto which the excitation light is so shone is increased, whereby the luminous efficiency thereof is decreased, which decreases the quantity of luminescent light emitted from the luminescent wheel 101, this constituting a cause for reduction in luminance in an image to be projected.

Further, in the event that the light emitted from the excitation light source 71 is shone onto the same position on the luminescent wheel 101 at all times, the luminescent material situated at the portion onto which the excitation light is so shone becomes easy to be deteriorated, which may cause that the luminescent material is burned or separated from the base material.

Figure 5:
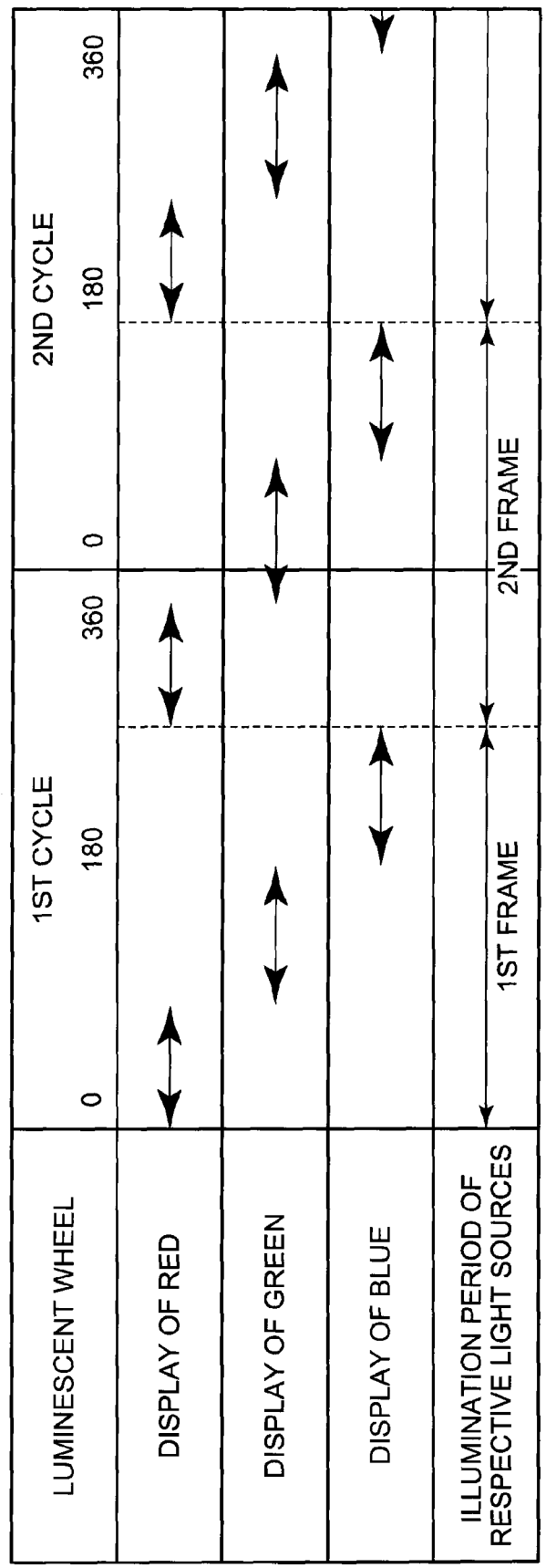
FIG. 5 is a chart showing a relationship between illumination cycles of respective light sources and rotation of the luminescent wheel of a light source unit according to the embodiment of the invention.

In order to prevent a local temperature increase in the luminescent material, the rotation of the luminescent wheel 101 and the illumination of the red light source 121, the excitation light source 71 and the blue light source 301 are controlled so that a period of rotation (i.e. cycle) of the luminescent wheel 101 does not become an integral multiple of a period of time sharing (i.e. frame) of the respective light sources 71, 121, 301. Namely, the respective light sources 71, 121, 301 are controlled with time sharing and the rotating speed of the luminescent wheel is controlled by controlling the wheel motor 110 so that as is shown in FIG. 5, the illumination period for one frame of the respective light sources 71, 121, 301, which denotes a case in which the red light source 121, the excitation light source 71 and the blue light source 301 are illuminated or turned on once and sequentially, does not become an integral multiple of a period of time required for one cycle of the luminescent wheel 101.

By controlling the illumination of the respective light sources 71, 121, 301 and the rotating speed of the luminescent wheel 101 in the way described above, the position on the luminescent wheel 101 where the pencil of light emitted from the excitation light source 71 is shone is changed by the number of frames of the respective light sources 71, 121, 301. Therefore, the occurrence of a phenomenon can be prevented that the excitation light is kept shone onto a predetermined location on the luminescent wheel 101 whereby the luminescent wheel 101 is locally heated.

In addition, since the luminescent wheel 101 can be prevented from being heated locally, the luminous efficiency of the luminescent material can be maintained constant. Thus, even in the event that the light source unit 60 is used continuously for many hours, the occurrence of unevenness in luminance in a projection image.

In the embodiment described above, the respective light sources 71, 121, 301 and the luminescent wheel 101 are controlled so that the period of time required for one frame of the respective light sources 71, 121, 301 does not become an integral multiple of the period of time required for one cycle of the luminescent wheel 101. However, the object of the invention can be attained even when a configuration is adopted in which only the period of time when the respective light sources 71, 121, 301 are turned on is controlled with the rotating speed of the luminescent wheel 101 maintained constant at all times or in which both the rotating speed of the luminescent wheel and the period of time when the respective light sources 71, 121, 301 are turned on are variably controlled.

In addition, in FIG. 5, the period of time required for one frame in which the red light source 121, the excitation light source 71 and the blue light source 301 are turned on individually is described as being shorter than the period of time required for one cycle of the luminescent wheel 101. However, although one frame which is the illumination period of the respective light sources 71, 121, 301 is longer than the period of time required for one cycle of the luminescent wheel 101 as is shown in FIG. 6, a similar advantage can be obtained by controlling the respective light sources 71, 121, 301 and the luminescent wheel 101 so that the period of time required for one frame of the respective light sources 71, 121, 301 does not become an integral multiple of the period of time required for one cycle of the luminescent wheel 101.

For example, when the quantity of the light ray of the red wavelength band is short, a control can be performed in which the period of time when the red light source 121 is turned on is made longer than the periods of time when the excitation light source 71 and the blue light source 301 are turned on. Even in such a case, the aforesaid advantage can be obtained by preventing the period of time required for one frame of the respective light sources 71, 121, 301 from becoming an integral multiple of the period of time required for one cycle of the luminescent wheel 101.

In addition, in the event that the respective light sources 71, 121, 301 and the luminescent wheel 101 are controlled so that the period of time required for one frame of the respective light sources 71, 121, 301 does not become an integral multiple of the period of time required for one cycle of the luminescent wheel 101, by controlling the respective light sources 71, 121, 301 and the luminescent wheel 101 so that a resulting number of dividing the period of time required for one cycle of the luminescent wheel 101 by the period of time required for one frame of the respective light sources 71, 121, 301 becomes an irrational number (i.e. an aliquant number) or a rational number close to an irrational number, that is, a number having a large number of decimal places, a possibility can be reduced that the illumination of the respective light sources 71, 121, 301 is synchronized with the cycle of the luminescent wheel 101 by the same light sources being turned on repeatedly a plurality of times, thereby making it possible to enhance the effectiveness of preventing the luminescent wheel 101 from being heated locally.

In the event that the respective light sources 71, 121, 301 and the luminescent wheel 101 are controlled so that the resulting number of dividing the period of time required for one cycle of the luminescent wheel 101 by the period of time required for one frame of the respective light sources 71, 121, 301 becomes the rational number close to an irrational number, it is preferable that the number of decimal places of the rational number is three or larger. This is because since the display device 51 used in this embodiment can display color images of the order of 30 to 60 frames per second, the illumination period of the respective light sources 71, 121, 301 and the cycle of the luminescent wheel 101 are prevented from being synchronized with each other within a period of several seconds.

Further, in the embodiment described above, while the light source unit 60 is described which includes the luminescent wheel 101 which emits the light ray of the green wavelength band, as well as the red light source 121 and the blue light source 301, the invention is not limited to this configuration. The same control method can be applied to any type of light source unit 60, provided that the light source unit 60 includes a luminescent wheel 101 and two types of light sources which can emit light rays of wavelength bands which are different from a predetermined wavelength band of the light ray emitted from the luminescent wheel 101.

In addition, the invention is not limited to the embodiment that has been described above and can be modified variously in various stages in carrying out the invention without departing from the spirit and scope of the invention. The functions which are executed in the aforesaid embodiment may be combined as in many ways as possible in carrying out the invention. The aforesaid embodiment includes various steps, and by combining appropriately the plurality of constituent requirements disclosed, various inventions can be extracted. For example, in the event that the advantage can be obtained with some constituent requirements deleted from all the constituent requirements disclosed in the embodiment, the configuration in which the constituent requirements are so deleted can be extracted as an invention.

What is claimed is:

1. A light source unit comprising:
    an excitation light shining device for emitting excitation light;
    a luminescent wheel provided with a luminescent material on at least a whole circumferential area through which the excitation light passes, the luminescent material receiving the light emitted from the excitation light shining device as excitation light to emit a luminescent light ray of a predetermined wavelength band;
    two types of light source devices which emit light rays of different wavelength bands from that of the light ray emitted from the luminescent wheel;
    a light source optical system for collecting the luminescent light ray emitted from the luminescent wheel and the light rays emitted from the two types of light source devices onto a predetermined plane; and
    a light source control device for time sharing controlling the excitation light shining device and the two types of light source devices and controlling a rotation of the luminescent wheel;
    wherein the light source control device controls, with time sharing, the excitation light shining device and the two types of light source devices and controls a rotating speed of the luminescent wheel so that a period of time required for the excitation light shining device and the two types of light source devices to be turned on once and sequentially does not become an integral multiple of a period of time required for the luminescent wheel to rotate one rotation.

2. The light source unit as set forth in claim 1, wherein:
    the luminescent material laid on the luminescent wheel comprises a green luminescent material which receives the light emitted from the excitation light shining device to emit a luminescent light ray of a green wavelength band; and
    the two types of light source devices comprise a red light source device for emitting a light ray of a red wavelength band and a blue light source device for emitting a light ray of a blue wavelength band.

3. The light source unit as set forth in claim 1, wherein the light source control device controls, with time sharing, the excitation light shining device and the two types of light source devices and controls the rotating speed of the luminescent wheel so that, when the period of time required for the luminescent wheel to rotate one rotation is divided by the period of time required for the excitation light shining device and the two types of light source devices to be turned on once and sequentially, a number resulting from the dividing becomes a rational number close to an irrational number.

4. A projector comprising:
    a light source unit, the light source unit comprising:
        an excitation light shining device for emitting excitation light;
        a luminescent wheel provided with a luminescent material on at least a whole circumferential area through which the excitation light passes, the luminescent material receiving the light emitted from the excitation light shining device as excitation light to emit a luminescent light ray of a predetermined wavelength band;
        two types of light source devices which emit light rays of different wavelength bands from that of the light ray emitted from the luminescent wheel;
        a light source optical system for collecting the luminescent light ray emitted from the luminescent wheel and the light rays emitted from the two types of light source devices onto a predetermined plane; and
        a light source control device for controlling, with time sharing, the excitation light shining device and the two types of light source devices and controlling a rotation of the luminescent wheel, wherein the light source control device controls, with time sharing, the excitation light shining device and the two types of light source devices and controls a rotating speed of the luminescent wheel so that a period of time required for an image of one frame to be produced by use of the light from the excitation light shining device and the light rays from the two types of light source devices does not become an integral multiple of a period of time required for the luminescent wheel to rotate one rotation;
    a display device for producing an image by modulating the light from the light source unit;
    a light guiding optical system for guiding the light from the light source unit to the display device;
    a projection-side optical system for projecting an image emitted from the display device onto a screen; and
    a projector control device for controlling the light source unit and the display device.

5. The light source unit as set forth in claim 1, wherein the light source control device controls, with time sharing, the excitation light shining device and the two types of light source devices and controls the rotating speed of the luminescent wheel so that, when the period of time required for the luminescent wheel to rotate one rotation is divided by the period of time required for the excitation light shining device and the two types of light source devices to be turned on once and sequentially, a resulting number of the dividing becomes a rational number having at least three decimal places.

* * * * *